(12) United States Patent
Quaade et al.

(10) Patent No.: US 8,931,262 B2
(45) Date of Patent: Jan. 13, 2015

(54) METHOD AND DEVICE FOR CONTROLLING EFFECTIVE HEAT TRANSFER IN A SOLID GAS STORAGE SYSTEM

(75) Inventors: Ulrich Joachim Quaade, Bagsvaerd (DK); Tue Johannessen, Glostrup (DK); Jacob Hjerrild Zeuthen, Birkerød (DK); Henning Schmidt, Dyssegard (DK)

(73) Assignee: Amminex Emissions Technology A/S, Soborg (DK)

( * ) Notice: Subject to any disclaimer, the term of this patent is extended or adjusted under 35 U.S.C. 154(b) by 51 days.

(21) Appl. No.: 13/634,298

(22) PCT Filed: Mar. 16, 2011

(86) PCT No.: PCT/EP2011/001309
§ 371 (c)(1),
(2), (4) Date: Dec. 28, 2012

(87) PCT Pub. No.: WO2011/113593
PCT Pub. Date: Sep. 22, 2011

(65) Prior Publication Data
US 2013/0118152 A1    May 16, 2013

Related U.S. Application Data

(60) Provisional application No. 61/314,367, filed on Mar. 16, 2010.

(30) Foreign Application Priority Data

Mar. 16, 2010    (EP) .................................... 10002763

(51) Int. Cl.
*F01N 3/00*    (2006.01)
*F01N 3/10*    (2006.01)
(Continued)

(52) U.S. Cl.
CPC ............ *F01N 3/208* (2013.01); *B01D 53/0438* (2013.01); *B01D 53/0454* (2013.01);
(Continued)

(58) Field of Classification Search
USPC ........ 60/295, 301, 303; 96/108, 143; 206/0.7; 222/3; 429/515
See application file for complete search history.

(56) References Cited

U.S. PATENT DOCUMENTS

| 6,015,041 A | 1/2000 | Heung |
| 6,860,923 B2 | 3/2005 | Myashikov |

(Continued)

FOREIGN PATENT DOCUMENTS

| CN | 2554807 | 6/2003 |
| CN | 100342575 C | 10/2007 |

(Continued)

OTHER PUBLICATIONS

Partial European Search Report dated Dec. 2, 2010 for Application No. EP 10002763.0.

(Continued)

*Primary Examiner* — Audrey K Bradley
(74) *Attorney, Agent, or Firm* — Frost Brown Todd LLC

(57) ABSTRACT

A method for controlling the effective heat transfer from a storage unit (1). During gas release from storage material (3) in the storage unit the storage material is heated by a heater (2). During re-saturation of the storage material (3) with gas the heater is off. Controlling of the effective heat transfer from the storage unit (1) is performed, during gas release, by ceasing convection of a convection gas and, during re-saturation, by performing or enabling convection of a convection gas to cool the storage unit (1).

12 Claims, 5 Drawing Sheets

(51) Int. Cl.
  *B01D 53/02* (2006.01)
  *B01D 53/12* (2006.01)
  *B65D 85/00* (2006.01)
  *B65B 3/00* (2006.01)
  *F01N 3/20* (2006.01)
  *B01D 53/04* (2006.01)
  *C01C 1/00* (2006.01)
  *F17C 11/00* (2006.01)

(52) U.S. Cl.
  CPC ............... *C01C1/006* (2013.01); *F17C 11/00* (2013.01); *B01D 2251/2062* (2013.01); *B01D 2259/4525* (2013.01)
  USPC .................. 60/295; 60/301; 60/303; 95/108; 95/143; 206/0.7

(56) References Cited

U.S. PATENT DOCUMENTS

| | | | |
|---|---|---|---|
| 7,727,492 B2 | 6/2010 | Myashikov | |
| 2010/0021780 A1* | 1/2010 | Johannessen et al. | 429/19 |
| 2010/0062296 A1* | 3/2010 | Johannessen | 429/19 |

FOREIGN PATENT DOCUMENTS

| | | |
|---|---|---|
| CN | 101162782 A | 4/2008 |
| DE | 102006061370 A1 | 6/2008 |
| DE | 102009000508 A1 | 2/2010 |
| EP | 0995944 A2 | 4/2000 |
| EP | 1338554 | 8/2003 |
| FR | 2924787 A1 | 6/2009 |
| GB | 1287690 A | 9/1972 |
| JP | 2009/215103 | 9/2009 |
| WO | WO 2006/012903 A2 | 2/2006 |
| WO | WO 2008/077652 A2 | 7/2008 |
| WO | WO 2010025947 A1 * | 3/2010 ............. B01D 53/14 |
| WO | WO 2011/113593 A1 | 9/2011 |

OTHER PUBLICATIONS

Kaplan, Y., "Effect of design parameters on enhancement of hydrogen charging in metal hydride reactors", International Journal of Hydrogen Energy 34 (2009) 2288-2294.

International Search Report and Written Opinion dated Jul. 25, 2011 for Application No. PCT/EP2011/001309.

Mellouli, S., et al "Hydrogen storage in metal hydride tanks equipped with metal foam heat exchanger", International Journal of Hydrogen Energy, vol. 34, No. 23, pp. 9393-9401, 2009. Abstract.

English Abstract and Machine Translation of Chinese Patent No. CN 2554807Y, Jun. 4, 2003.

English Abstract and Machine Translation of Chinese Patent No. CN 100342575C, Oct. 10, 2007.

English Abstract and Machine Translation of Chinese Patent No. CN 101162782A, Apr. 16, 2008

English Abstract and Machine Translation of German Patent No. DE 102006061370A1, Jun. 26, 2008.

English Abstract and Machine Translation of German Patent No. DE 102009000508A1, Feb. 4, 2010.

English Abstract and Machine Translation of European Patent No. EP 1338554A1, Aug. 27, 2003.

English Abstract and Machine Translation of French Patent No. FR 2924787A1, Jun. 12, 2009.

English Abstract of Japanese Patent No. JP 2009215103A, Sep. 24, 2009.

* cited by examiner

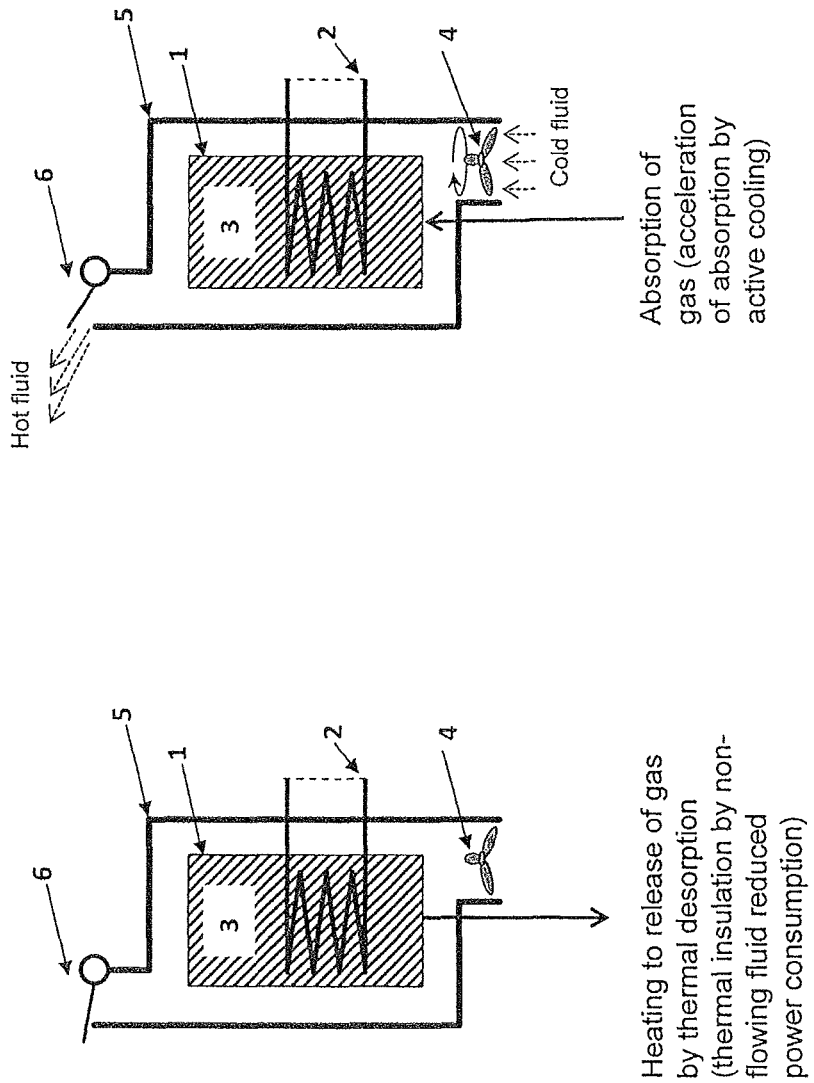

METHOD AND DEVICE FOR CONTROLLING EFFECTIVE HEAT TRANSFER IN A SOLID GAS STORAGE SYSTEM

FIELD OF THE INVENTION

This invention relates to the application of solid gas storage materials (e.g. solid ammonia storage materials) as sources for a gas (e.g. ammonia) in a gas (e.g.) ammonia consuming process by making the gas (e.g. ammonia) available by thermal desorption. Systems with in-situ resaturation of one storage unit by using gas (e.g. ammonia) available from one or more additional units benefit from the ability to reduce heat loss of the heated unit during thermal desorption while efficiently removing the heat of absorption during resaturation.

The method may also be used for other systems or concepts where there is a desire for controlled thermal boundary conditions of processes using reversible absorption/desorption of ammonia or other gases.

BACKGROUND OF THE INVENTION

Ammonia is a widely used chemical with many applications. One specific application is as reductant for selective catalytic reduction (SCR) of $NO_x$ in exhaust gas from combustion processes.

For most applications, and in particular in automotive applications, the storage of ammonia in the form of a pressurized liquid in a vessel is too hazardous. Urea is a safe, but an indirect and impractical method for mobile transport of ammonia since it requires urea to be transformed into ammonia by a complex process involving spray, evaporation, thermolysis and hydrolysis $((NH_2)_2CO+H_2O \rightarrow 2\ NH_3+CO_2)$, which is difficult to achieve under driving conditions with low engine load or cold weather.

A storage method involving ad- or absorption of molecular ammonia in a solid can circumvent the safety hazard of pressurized liquid ammonia and eliminate the problem with conversion of a liquid reductant.

Metal ammine salts are ammonia absorbing and desorbing materials, which can be used as solid storage media for ammonia (see, e.g. WO 2006/012903 A2), which in turn, as mentioned above, may be used as the reductant in selective catalytic reduction to reduce $NO_x$ emissions.

WO 2008/077652 A2 discloses a method and device that allows for rapid availability of ammonia from a solid storage material by having a system with two main functionalities: A small, operational unit heated by e.g. electricity and a larger ammonia storage unit that is used as a source to carry out on-board resaturation of the small unit.

However, when the smaller unit is heated for releasing ammonia by desorption, the elevated temperature results in heat loss to the surroundings. To reduce the power consumption during operation (i.e. lower fuel penalty on a vehicle), it requires insulation of the heated unit. But this has a negative effect on the speed or resaturation from the larger unit because it is difficult to remove the absorption heat when the smaller unit is insulated.

Therefore, there is a need for a new method and device for improving performance both in terms of power consumption as well as rate of resaturation.

SUMMARY OF THE INVENTION

According to a first aspect (an active convection aspect) the invention relates to a method for controlling the effective heat transfer from a storage unit, wherein the storage unit contains a solid gas storage material capable of reversible storage of a gas by absorption, or adsorption, and desorption. The method is carried out by using an apparatus comprising:

a fluid gap between an outer encapsulation and the storage unit that provides an insulation layer when there is no active movement of the fluid in the fluid gap;

a fluid flow device creating forced convection of fluid being in contact with the surface of the storage unit to increase heat transfer from the storage unit;

an exit of the encapsulation where the fluid forced in convection by the fluid flow device can exit;

a heater to heat the storage material;

wherein during gas release from the storage material the storage material is heated by the heater, and during re-saturation of the storage material with gas the heater is off; and wherein the controlling of the effective heat transfer from the storage unit is performed, during gas release, by ceasing operation of the fluid flow device, or by regulating the convection created by the fluid flow device such that it is lower than that during re-saturation; and, during re-saturation, by operating the fluid flow device, or by regulating the convection created by the fluid flow device such that it is higher than that during gas release; and wherein the fluid is a gas.

A device for controlled dosing of a gas to any process using the gas according to the active convection aspect comprises at least one storage unit containing a solid storage material capable of reversible absorption, or adsorption, and desorption of the gas. Said at least one storage unit is equipped with a heater to release the gas by desorption. The device further comprises:

a fluid gap between the at least one storage unit and an encapsulation;

a fluid flow device to control the flow of fluid through the gap between the at least one storage unit and the encapsulation, wherein the fluid is a gas;

a controller that is programmed to carry out the method of controlling the effective heat transfer according to above-mentioned method according to the active convection aspect.

According to another aspect (a passive convection aspect) the invention relates to a method for controlling the effective heat transfer from a storage unit, wherein the storage unit contains a solid gas storage material capable of reversible storage of a gas by absorption, or adsorption, and desorption. The method is carried out by using an apparatus comprising:

a fluid gap between an outer encapsulation and the storage unit that provides an insulation layer when there is no passive convection enabled;

a passive-convection control device enabling passive convection of fluid being in contact with the surface of the storage unit to increase heat transfer from the storage unit;

an exit of the encapsulation where the fluid with enabled passive convection can exit;

a heater to heat the storage material;

wherein during gas release from the storage material the storage material is heated by the heater, and during re-saturation of the storage material with gas the heater is off; and wherein the controlling of the effective heat transfer from the storage unit is performed, during gas release, by disabling passive convection by means of the passive-convection control device; and, during re-saturation, by enabling passive convection by means of the passive-convection control device; and wherein the fluid is a gas.

A device for controlled dosing of a gas to any process using the gas according to the passive convection aspect comprises at least one storage unit containing a solid storage material capable of reversible absorption, or adsorption, and desorption of the gas. Said at least one storage unit is equipped with a heater to release the gas by desorption. The device further comprises:
- a fluid gap between the at least one storage unit and an encapsulation;
- a passive-convection control device to control passive convection of fluid through the gap between the at least one storage unit and the encapsulation, wherein the fluid is a gas;
- a controller that is programmed to carry out the method of controlling the effective heat transfer according to above-mentioned method according to the passive convection aspect.

Other features are inherent in the methods and products disclosed or will become apparent to those skilled in the art from the following description of embodiments and its accompanying drawings.

BRIEF DESCRIPTION OF THE DRAWINGS

FIGS. 1a and 1b shows an embodiment of the invention.

DESCRIPTION OF EMBODIMENTS

Figure 2B:
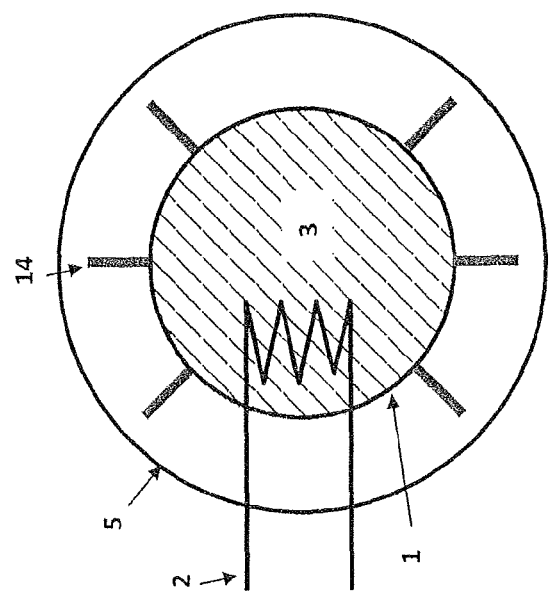
FIGS. 2a and 2b shows other details of embodiments of the invention.

Embodiments relate to a method and device for controlling the performance characteristics of solid gas (e.g. ammonia) storage units for reversible gas (e.g. ammonia) storage by absorption/desorption. For example, embodiments have a storage unit surrounded by a fluid gap which creates an insulation layer for reducing the heat loss from the heated unit during operation while having a controllable fluid flow device, such as a fan, blower or pump, that can actively circulate a fluid in the gap when the unit is exposed to elevated gas (e.g. ammonia) pressure for resaturation of the partly or fully depleted storage material. Alternatively, in other embodiments a passive-convection control device enables passive convection of the fluid. The fluid is a gas, e.g. air. The fluid gap is therefore a gas gap, e.g. an air gap. To avoid confusion with the gas stored in the storage unit(s) the gas flowing through the gas gap is also referred to as the "convection gas" while the gas stored in the storage unit(s) is also referred to as the "storage gas".

In the absence of (passive or active) convection the convection gas creates an insulation layer for reducing the heat loss while during (passive or active) convection it acts as a cooling fluid which transports heat away the storage unit(s). The resaturation rate highly depends on heat removal as the absorption of gas is often exothermic (e.g. ammonia releases in the order of 40-50 kJ/mole $NH_3$). Thus, the system performance characteristics is improved both during storage gas (e.g. ammonia) release by desorption and storage gas (e.g. ammonia) resaturation by absorption from another source.

Generally, in the embodiments the effective heat transfer is controlled to be lower during a period where a heater is generating a storage gas flow from the storage unit, while the effective heat transfer is higher during a period where the storage unit generates heat by absorbing storage gas. The lower and higher effective heat transfer is obtained, in active-convection embodiments, by ceasing operation of the fluid flow device and operating the fluid flow device, respectively, or by regulating the convection created by the fluid flow device such that it is lower and higher, respectively. In alternative passive-convection embodiments it is obtained by disabling and enabling passive convection by means of a passive-convection control device, respectively.

The storage gas may be any gas that can be reversibly adsorbed, or absorbed, and desorbed in a solid storage material. For example, the storage gas may be $H_2S$ and the corresponding solid storage material activated carbon, or the storage gas may be $CO_2$ and the corresponding storage medium a carbon molecular sieve. The storage gas may e.g. also be hydrogen which may be stored in e.g. amorphous carbon, a metal organic framework (MOF) or certain zeolites.

A preferred storage gas is ammonia which may be reversibly stored e.g in (preferably acid-) activated carbon, many zeolites and metal salts in the form of metal ammine complex salts (also simply termed "metal ammine salts").

Preferred metal ammine salts (i.e. metal salts containing absorbed ammonia) have the formula

$$M_a(NH_3)_nX_z, \quad (I)$$

wherein M is one or more cations selected from alkali metals such as Li, Na, K or Cs, alkaline earth metals such as Mg, Ca, Sr or Ba, and/or transition metals such as V, Cr, Mn, Fe, Co, Ni, Cu, or Zn or combinations thereof, such as NaAl, KAl, $K_2Zn$, CsCu, or $K_2Fe$; X is one or more anions selected from fluoride, chloride, bromide, iodide, nitrate, thiocyanate, sulphate, molybdate, and phosphate ions; a is the number of cations per salt molecule; z is the number of anions per salt molecule; and n is the coordination number of 2 to 12, preferably 6 to 8.

Particularly preferred metal ammine salts are $Sr(NH_3)_8Cl_2$, $Ca(NH_3)_8Cl_2$, $Mn(NH_3)_6Cl_2$, $Mg(NH_3)_6Cl_2$ and mixtures thereof.

In the following the principles of the invention will be described with particular reference to ammonia as a storage gas, however, the invention is not limited thereto.

Resaturation of partly of fully degassed ammonia storage units is influenced mainly by two parameters: supply pressure and heat dissipation. In a system presented in WO 2008/077652 A2, the resaturation of the small, operation unit (the start-up unit) is done by ammonia from a larger unit. In the special case of WO 2008/077652 A2 where the storage material in the start-up unit (STU) and main unit (MU), the MU is heated to generate the pressure required for resaturation of the STU. It is disclosed that the resaturation may take place after the vehicle has been parked—even up to one hour after the vehicle has been stopped—since a valve between the MU and STU could be a passive check valve (one-way valve). This is because the heated main unit has a higher thermal capacity and—in particular—when it is insulated, it remains pressurized for a longer period of time after the vehicle has been stopped. The absorption in the partly saturated STU will only start to take place after the STU has cooled down (after use) to a level where the pressure is lower than the pressure the MU. Further, absorption in the STU is only possible while the MU is still warm and therefore any acceleration of the rate of absorption will be an advantage. As a consequence, there should be no insulation of the STU because this would slow down the heat dissipation during the resaturation period. On the other hand, any insulation of the STU would decrease the power consumption of the STU during the actual use where it is heated to release ammonia. The power consumption is used for two things: compensating for the endothermic ammonia desorption and to compensate for the heat loss to the surroundings. These two values of power may be e.g. 30 W heat loss and 20 W power for desorbing ammonia, respectively. If the STU was insulated, the 30 W could be reduced to e.g. 5 W and the overall power consumption of the system would be reduced—but with negative effect on the resaturation rate.

In some embodiments of the present invention with an STU both challenges mentioned above are solved by having the STU inserted in slightly a larger, hollow container that creates an fluid gap (the fluid is a gas, such as air) around the unit and, in addition, has an inlet and exit hole combined with a small fluid flow device, such as a fan, blower, or pump, that can actively exchange the fluid (e.g. air) around the STU with fluid (e.g. air) from the surroundings. In alternative embodiments the fluid exchange is made by passive convection in a controllable manner by means of a device arranged to selectively enable and disable passive convection. Both the active and passive convection embodiments essentially allow making a system with a storage unit where the heat transfer can be changed by an electrical switch. When the unit is in operation for heated desorption of ammonia, the gas (e.g. air) in the gap between the unit and the surroundings becomes an insulating layer but when accelerated resaturation is required, the fan/blower/pump can be switched on and by a very low electrical power (e.g. 0.5-10 W power for a fan) (or alternatively, the passive-convection control device can be activated and by enabling passive convection) one can thus remove much a higher enthalpy content from the STU. The convection gas (e.g. air) passes through the hollow gap at the temperature of the surroundings and leaves the exit of the encapsulation with a 20-40 Kelvin higher temperature because of heat release from the STU that is absorbing ammonia.

In some embodiments the storage material is a solid ammonia storage material, and the gas stored in the storage material (i.e. the storage gas) is ammonia.

The cooling effect by the (active or passive) convection gas is based on heat transport; i.e. the convection gas enters the gap in the gaseous state with a lower temperature and leaves the gap in the gaseous state with a higher temperature, i.e. it is not subjected to any phase transition, for example from liquid to gas, during the process of cooling.

In some embodiments, for example in embodiments in which the storage gas is ammonia, the storage unit is cooled towards ambient temperature. For example, if the convection gas is atmospheric air at the temperature of the surroundings, the air leaves the exit of the encapsulation at an elevated temperature due to the heat absorbed. In other words, in these embodiments the storage unit is not cooled below ambient temperature.

In other embodiments, depending on the nature of the storage gas, the convection gas is cooled before entering the gap. Usually, the temperature of the convection gas entering the gap is higher than the boiling point of the storage gas.

In some of the active-convection embodiments the fluid flow device is a fan, blower, or pump.

In some of the passive-convection embodiments the passive-convection control device comprises at least one shutter arranged to selectively open and close a fluid-flow path including the fluid gap.

For example, in some embodiments, the at least one shutter is arranged to close the exit, or outlet, of the encapsulation where the fluid able to flow due to passive convection can exit. This shutter is also referred to as exit shutter, or outlet shutter. In other embodiments the at least one shutter is arranged to close the inlet into the encapsulation where the fluid able to flow due to passive convection can enter, also referred to as inlet shutter. In still other embodiments the passive-convection control device comprises an outlet shutter and an inlet shutter.

In some embodiments, the outlet or inlet shutter is actively opened and/or closed by an actuator, e.g. an electromagnetic actuator. The shutter may be spring-biased in some embodiments so that the actuator only provides opening or closing actuation movement while the other actuation movement (closing or opening) is performed by the actuator releasing the spring force. In other embodiments both the opening and closing actuation movement is produced by the actuator itself.

All these shutter-actuation-related alternatives may also apply to embodiments with outlet and inlet shutters. In some of the double-shutter embodiments the outlet-shutter actuator and the inlet-shutter actuator are controlled in common so that both shutters are opened and closed in unison.

To enable passive convection the storage unit and its encapsulation are arranged such that the longitudinal direction of the air gap (which is mainly characterized by the direction of convection between the inlet and the exit for the convection gas) is oriented vertically or at least with a component in the vertical direction, and the inlet for the convection gas is lower than the exit. "Vertical" and "lower" refers to the nominal orientation of the storage unit and the apparatus to which it is mounted. For example, the nominal orientation of vehicle is determined by the vehicle standing on the vehicle wheels; in a vehicle the storage unit is mounted such that the convection gap is oriented vertically or at least with a component in the vertical direction when the vehicle stands on its wheels.

In some embodiments the effective heat transfer is enhanced by heat transfer fins connected to the surface of the storage unit.

In principle, it may happen that more storage gas (e.g. ammonia) is released by heating the storage unit than is actually demanded at a certain point of time, e.g. due to thermal inertia. This may cause the pressure of the storage unit to overshoot a level of the maximum allowed pressure.

In some of the active-convection embodiments the level of a pressure overshoot is reduced by actively lowering the temperature level of the storage unit heated by a heater by activating the fluid flow device, or increasing the convection created by the fluid flow device, and shutting off the heater until the desorption pressure is determined to be close to a setpoint.

Analogously, in some of the passive-convection embodiments the level of a pressure overshoot is reduced by actively lowering the temperature level of the storage unit heated by a heater by enabling passive convection by means of the passive-convection control device, and shutting off the heater, until the desorption pressure is determined to be close to a setpoint.

In some embodiments, in order to increase the rate of re-saturation of the storage material with the storage gas after use of the storage unit (i.e. after storage gas desorption), the level of the storage gas pressure is reduced immediately after use of the storage unit. In some of the active-convection embodiments this is performed by activating the fluid flow device, or increasing the convection created by the fluid flow device, until the desorption pressure is close to or at the level of pressure obtained when the unit is in thermal equilibrium with the surroundings. In some of the passive-convection embodiments this is performed by enabling passive convection by means of the passive-convection control device until the desorption pressure is close to or at the level of pressure obtained when the unit is in thermal equilibrium with the surroundings.

In some embodiments an additional larger storage unit is used that has a supply pressure generated by heating of the material in the larger unit. In some of the active-convection embodiments the fluid flow device is activated, or the convection created by the fluid flow device increased, when the storage gas is delivered from the larger storage unit, thereby increasing the rate of resaturation of the storage material of the smaller storage unit with storage gas due to cooling. Analogously, in some of the passive-convection embodiments passive convection is enabled by means of the passive-convection control device, when the storage gas is delivered from the larger storage unit, thereby increasing the rate of resaturation of the storage material of the smaller storage unit with storage gas due to cooling.

In some of the embodiments in which the storage gas is ammonia the solid storage medium is either active carbon, a zeolite or metal ammine complex capable of storing ammonia by absorption or adsorption.

In some embodiments with ammonia as the storage gas the ammonia is stored and released to enable NOx produced by an internal combustion engine, e.g. of a vehicle, to be removed by selective catalytic reduction. Some of these embodiments comprise a controller for a vehicle, or a for a stationary internal combustion engine, that uses solid ammonia storage material for the purpose of removing NOx by selective catalytic reduction. The controller is programmed to carry out at least one of the methods described herein.

In some embodiments of a device for reducing NOx from the exhaust of an internal combustion engine via selective catalytic reduction the storage gas is ammonia and the storage material is a metal ammine complex salt, such as $Sr(NH_3)_8Cl_2$, $Ca(NH_3)_8Cl_2$, $Mn(NH_3)_6Cl_2$, $Mg(NH_3)_6Cl_2$, or mixtures thereof. The heating may be electrical heating and/or heating by waste heat of the engine.

Turning now to the figures, FIGS. 1a and 1b show embodiments where a storage unit 1 with a solid ammonia storage material 3 that releases ammonia upon heating by a heater 2. The outer encapsulation 5 creates an fluid gap outside of the storage unit 1 and a fluid flow device 4, e.g. a a fan 4, can create a flow of fluid that is passed through an outlet 6 that may comprise a one-way valve that allows passage out of the gap but does not allow natural convection of fluid (e.g. air) out of the gap when the fluid flow device 4 is switched off. FIG. 1a shows the embodiment when the fan 4 is off and the heater 2 is on whereby ammonia can be desorbed without excessive heat loss from the surface of the heated unit 1. FIG. 1b shows the embodiment when the fan 4 is operated and fluid is flowing through the gap to the one-way passage 6 and transporting heat of absorption away from the unit 1 during a period of resaturation from another source (not shown here). The specific outlet with one-way flow functionality 6 can be omitted if the natural convection of fluid (e.g. air) through the gap is difficult because of the dimensioning of the flow inlet/outlet and/or the size of the gap. The ability of the passive flow through the gap when the fluid flow device 4 is switched off may also be prohibited by the design of the fluid flow device. Optionally, the encapsulation 5 can be made of an insulating material and/or be coated with a reflecting material. The heater can be positioned either internally in the storage material 3 or externally. The fluid flow device 4 can be positioned at any location in the fluid gap. Preferably, it is positioned at the inlet or the outlet. Optionally, a one way flow valve can be installed in the inlet as well.

Figure 2A:
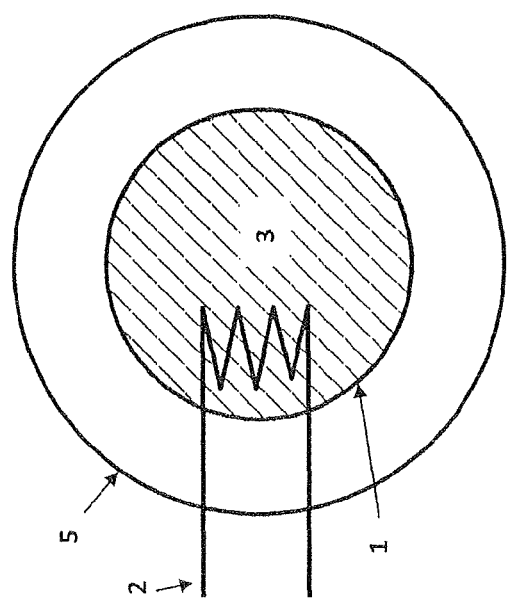

FIGS. 2a and 2b shows embodiments from a different angle. Here, a cross section of the system is shown. There is a (concentric) gap of fluid (e.g. air) between the storage unit 1 and the additional enclosure 5 whereby the fluid gap forms an insulation layer when the heater 2 is heating the storage material 3 to release the absorbed gas. During resaturation, the heater 2 is off and the fluid flow device transports fluid in the annular space between the unit 1 and the wall of the enclosure 5. The flow of fluid through the gap and the difference in temperature from inlet to outlet determines the amount of heat removed from the unit 1. To further accelerate the resaturation, the storage unit may be equipped with means for increasing the heat transfer between the unit 1 and the air in the gap between the unit 1 and the wall 5. This may be done in conventional way by means of fins 14. These fins will improve the heat removal during resaturation but they will not have a particular negative effect in the non-flowing case of using it the gap as insulation layer.

Figure 3:
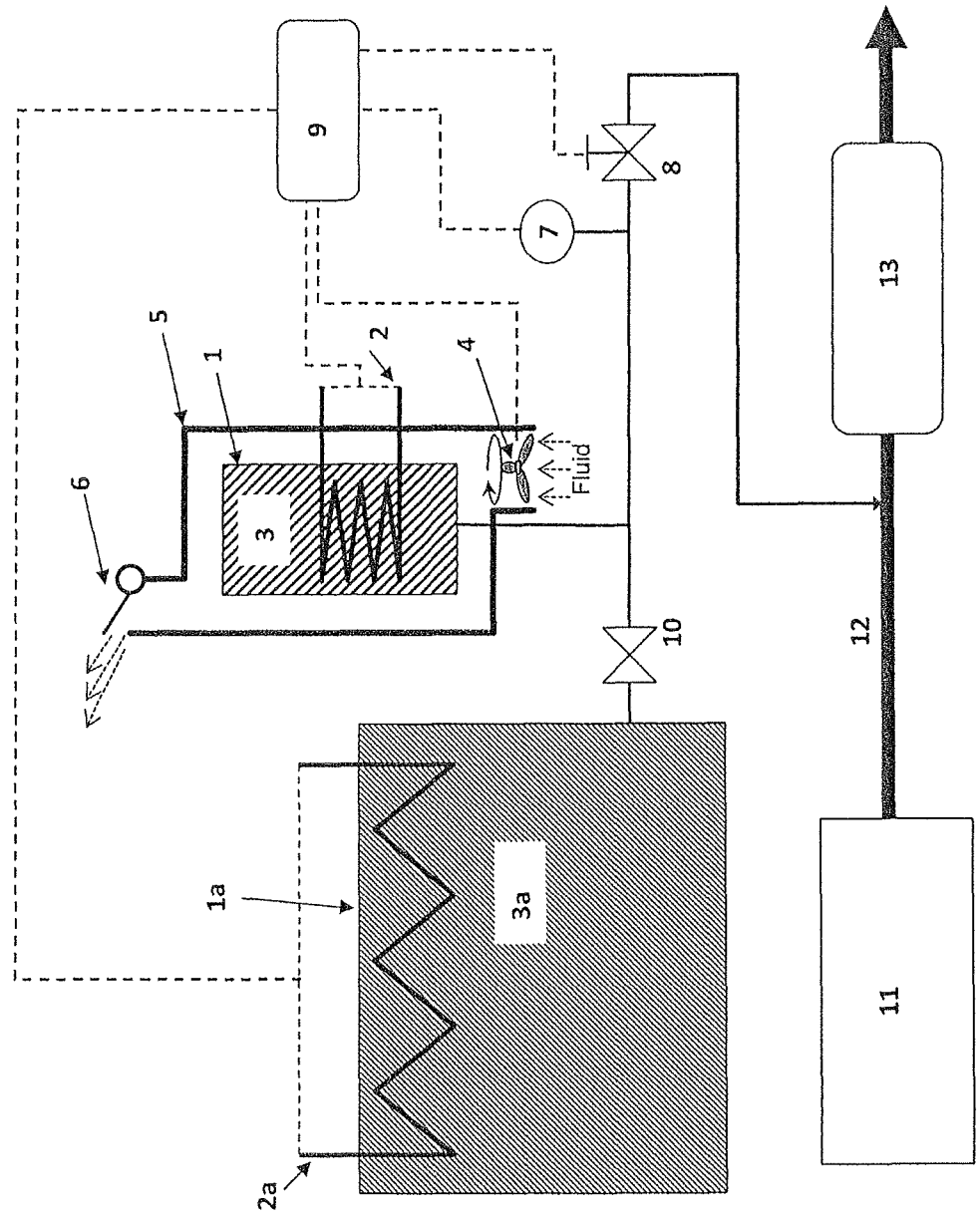
FIG. 3 is an overall schematic diagram of functional units of an embodiment of system for the controlled release of gas, e.g. ammonia storing, according to the invention.

FIG. 3 shows an embodiment where the device described so far is integrated into a complete system for controlled release of the stored gas, e.g. ammonia, and efficient resaturation of a small storage unit. The system includes a small storage unit 1 with an ammonia storage material 3 that can release an absorbed gas from a storage material 3 by means of heating 2. The small unit 1, e.g. referred to as a start-up unit (STU), is kept in an enclosure 5 equipped with an inlet for fluid (e.g. air) that is controlled by a fluid flow device (e.g. a fan/blower/pump) 4 and an exit that may comprise a suitable one-way flow valve 6 that provides an opportunity for letting fluid out of the enclosure with low pressure drop but that does not allow (back-)flow when a fluid flow device 4 is not operated. The system also comprises one (or more) a larger unit(s) 1a with a storage material 3a storing the same gas as in the smaller unit 1. A heater 2a heating the larger unit 1a can elevate the pressure of the absorbed gas, e.g. ammonia, to provide a pressure gradient for re-absorption in the smaller unit 1. For this to happen efficiently, a valve 10 is placed between the two units 1a and 1 to avoid that the gas from the smaller unit 1 can be absorbed in the larger unit 1a instead of being dosed. This valve 10 is typically a passive one-way valve but it may be other types of valves. The system also comprises a dosing valve 8 and a pressure sensor 7 to measure the pressure of the desorption process from the heated 2 (or 2a) tanks 1 (or 1a). More than just one pressure sensor (not shown) may be used when there is more than one tank in the system. The process that requires the dosing of the gas (e.g. ammonia) from the storage units (1, 1a) may by an exhaust 12 from an internal combustion engine 11 that passes through an SCR catalyst 13 for reduction of NOx form the engine 11. But other processes that require the function of the present invention are envisaged. In the system outlined in FIG. 3, the operation strategy is similar to that of WO 2008/077652 A2, i.e. the dosing of ammonia is mostly done from the smaller unit 1 but resaturation is done from the larger unit 1a by heating it 2a. However, with the embodiments described herein, the resaturation process is much faster and efficient because of the accelerated heat removal by activation of the fan/blower/pump 4 while at the same time reducing the heat loss from the unit 1, while it is in normal operation mode for desorbing the storage gas (e.g. ammonia) by heating 2.

In an embodiment such as the one disclosed in FIG. 3, there are other positive optional features:

In one aspect of providing additional features, the fluid flow device 4 is activated in a situation where the heater 2 has raised the pressure level measured by the sensor 7 to a too high level whereby the heater 2 is turned off. However, such a pressure over-shoot can be reduced by activating the fluid flow device 4 (e.g. a fan) while the heater 2 is off and increasing the cooling of the unit 1 whereby the pressure drops to a level closer to a desired set-point because the temperature of the material 3 is reduced. This reduction in temperature does not require a temperature sensor in the unit 1 to operate because of the relation between temperature and the pressure measurement 7.

In yet another additional feature, the fluid flow device 4 is activated immediately when the system is shut off from normal operation, e.g. when a vehicle using the system is parked. That enables a rapid drop from operating pressure to the pressure level similar to the thermal equilibrium between the surroundings. As an example, $Sr(NH_3)_8Cl_2$ has an operating vapor pressure of 2.5 bars when heated to approx. 50-60° C. whereas there is a desire to reach a non-pressurized state of 0.4-0.5 bars at room temperature. An accelerated cooling that enables reaching the pressure below one bar is an advantage of the invention—and not just for reaching a state where the smaller unit 1 is ready to absorb gas (ammonia) from the larger unit 1a when it is heated 2a.

In a preferred embodiment, the storage material (3, 3a) is a metal ammine complex salt—in particular $Sr(NH_3)_8Cl_2$, $Ca(NH_3)_8Cl_2$, $Mn(NH_3)_6Cl_2$, $Mg(NH_3)_6Cl_2$ or mixtures thereof are preferred. Other materials such as zeolites or active carbon can be applied.

Figure 4:
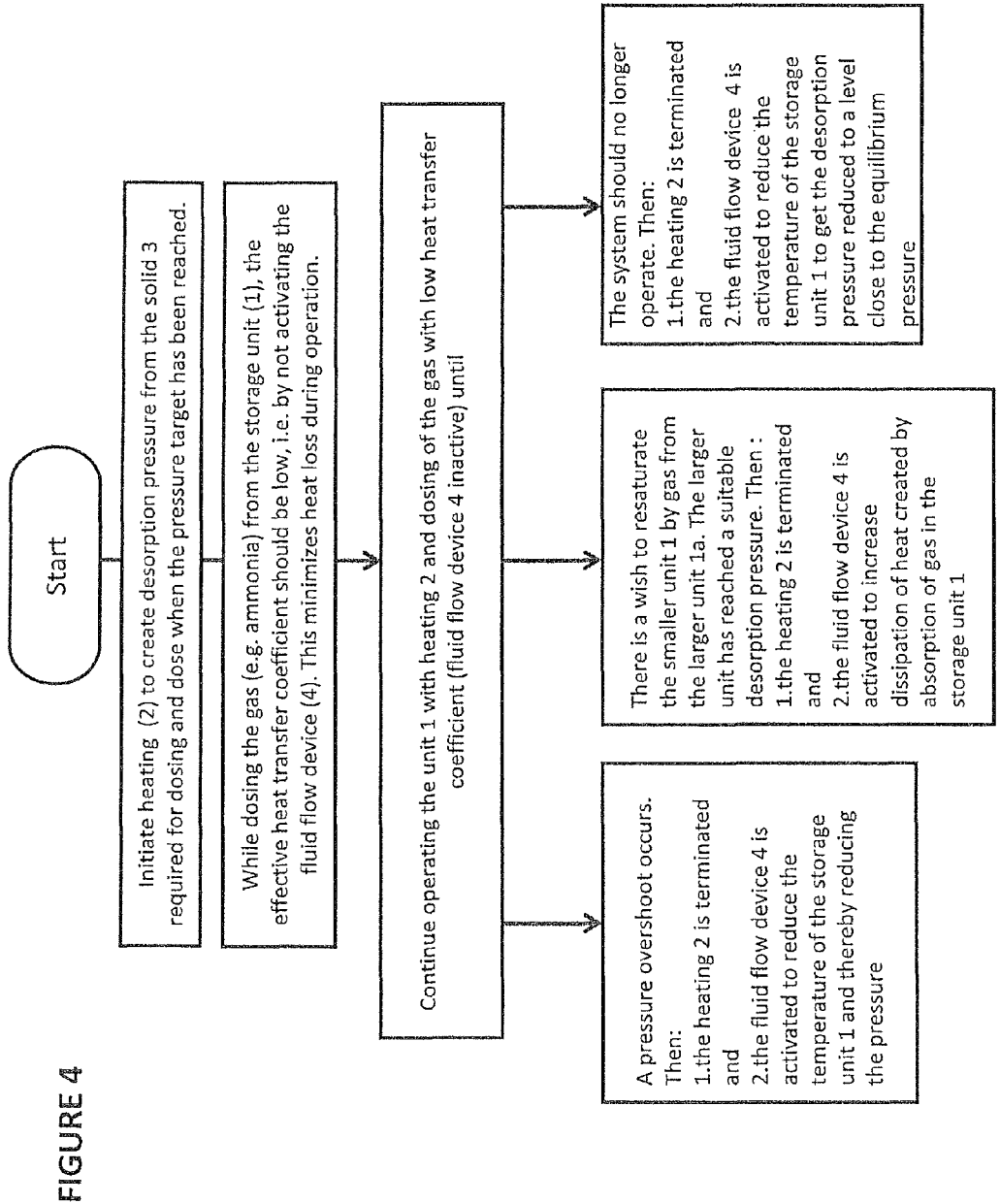
FIG. 4 shows an embodiment of the method according to the invention.

FIG. 4 shows how the change in operation of heating 2 and fluid flow device 4 may be done to obtain certain features, i.e. low heat loss during operation and
- reduction of a pressure over-shoot
- accelerated resaturation or
- reduction in pressure from operating point to thermal equilibrium with the surroundings Example 1

A small storage unit of approx. 500 ml with $Sr(NH_3)_8Cl_2$ is partly degassed of, i.e. some of the material is $Sr(NH_3)_{8-n}Cl_2$ where $n \in [1, 2, \ldots, 8]$. The storage unit 1 is placed at room temperature and it is exposed to ammonia from a pressurized source giving an elevated pressure. Two experiments are made: a) one where there is no encapsulation 5 or fluid flow device 4 and therefore only passive cooling by normal natural convection around the warm unit (i.e. slow heat transfer without a convection gap) and b) one where there is active cooling by forced convection from a blower 4. The ammonia absorption in the two cases are dramatically different:
- passive cooling by normal natural convection: 10.2 g $NH_3$ is absorbed from the pressurized source.
- active cooling by a small blower: 18.1 g is absorbed from the pressurized source.

Thus, it is seen that slow cooling by natural convection without a convection gap (which will always be a possible heat transfer mechanisms of e.g. a normal radiator installed in houses) can be improved significantly when the fluid flow device 4 in the encapsulation 5 is activated. However, the improved insulation cannot be obtained when the fluid gap is not present.

Example 2

During normal operation of a small storage unit 1, the power for operating the unit, heating 2, consist of two parts: heat for releasing ammonia and heat loss to the surroundings. Assuming the unit 1 has a surface area of 0.03 $m^2$ and is operated on a vehicle that drives on the road. Without the insulation by an air gap around the unit 5, the forced convection caused by the cold air (e.g. 5° C.) flowing around the unit gives a heat loss from the 50° C. surface temperature of the unit 1 of approx.:

$$(55° C. - 5° C.) * 30 W/m^2/° C. * 0.03 m^2 = 45 W.$$

(assuming heat transfer coeff. of 30 W/m2/° C.

If the unit according to the invention is less exposed to the environment during operation the heat loss could be reduced to:

$$(55° C. - 5° C.) * 5 W/m^2° C. * 0.03 m^2 = 7.5 W$$

(assuming heat transfer coeff. of 5 W/m2/° C.
This would have a non-negligible influence on the power withdrawn from the battery or generator of the vehicle.

Thus, it is demonstrated that embodiments according to the invention has both a positive influence in the case of resaturation as well as the operating performance.

Example 3

A small storage unit 1 of approx. 500 ml is kept in an encapsulation 5 made of either metal or e.g. injection-molded plastic/polymer (a polymer further reduces the heat loss from the encapsulation). One end of the encapsulation is equipped with a small fan 4—similar as inexpensive blowers for computers—with a diameter of 4 cm. Such a small blower may use less than 1 W and still create a flow of 10 $m^3$ air per hour (=10000 [liter/hr]/24.5 [liter/mol]/3600 [s/hr]=0.113 mol/s) through the annular gap of e.g. 0.5 cm around the unit 1.

Air (or calculated as $N_2$) with heat capacity of approx. 20 J/mol/K flows around a unit 1 during absorption and the temperature of the air flow increases by 20K (from e.g. 298K to 318K). The heat transfer from forced convection created by the fan 4 is then approx.:

$$0.113 [mol/s] * 20 [K] * 20 [J/mol/K] = 45.4 W.$$

The absorption enthalpy of ammonia is approx. 42 kJ/mol $NH_3$ and with a cooling rate of 45.4 W, then a flow of ammonia of $1.08*10^{-3}$ mol $NH_3$/sec. can be absorbed with proper heat dissipation. In a 30 minute period, this leads to 16.5 g $NH_3$, i.e. a theoretical calculation that leads to a result in the same order of magnitude as in example 1.

With example 3, it is demonstrated that existing types of equipment can be integrated into envisaged embodiments of the invention and obtain the desired results without adding significant complexity and costly components.

In summary, the embodiments—implemented as a method or device—are particularly advantageous for solid ammonia storage system used for reduction of NOx by SCR in vehicles or trucks (or similar applications requiring ammonia storage) powered by a combustion engine where the storage system has one or more of the following features:
- a smaller storage unit 1 (e.g. 50 ml to 3 liter in size containing 25 g to 1.5 kg $NH_3$ stored), heated 2 by electricity or other means.
- An insulating air gap around the smaller unit created by a larger encapsulation 5 with a gas passage controlled by a fan/blower/pump 4 to increase the heat transfer when the fan is operated and to insulate when the fan is off.
- one or more larger solid storage units 1a with means for heating 2a (e.g. 500 ml to 20 liters containing 400 g to 20 kg $NH_3$) capable of storing enough ammonia in a storage material 3a for a desired service operating interval (e.g. 25000 km).

controller algorithms according to the invention which allows for improving the performance by:
reducing the power consumption by not activating the fan during desorption of ammonia from the storage unit 1.
increasing the rate of resaturation by activating the fan/blower 4 when a lower pressure and increased heat transfer from the unit 1 is desired.
increasing the rate of reducing a pressure overshoot created by too much heating 2 of the storage material 3 unit 1.

Figure 5A:
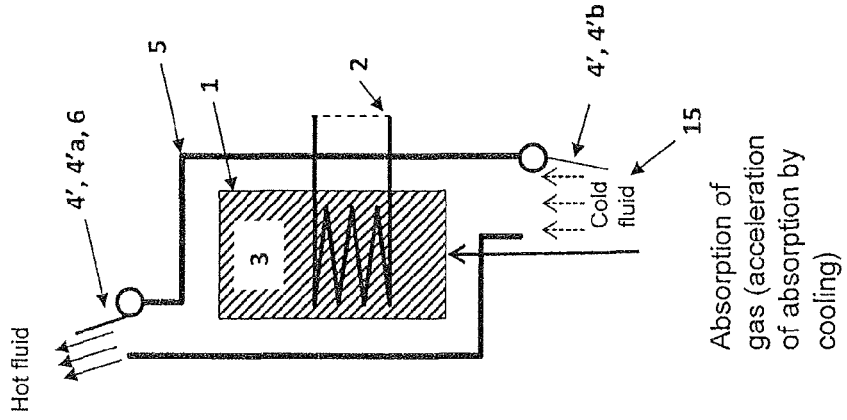
FIGS. 5a and 5b shows an embodiment similar to that of FIGS. 1a and 1b, but for performing passive convection.
Figure 5B:
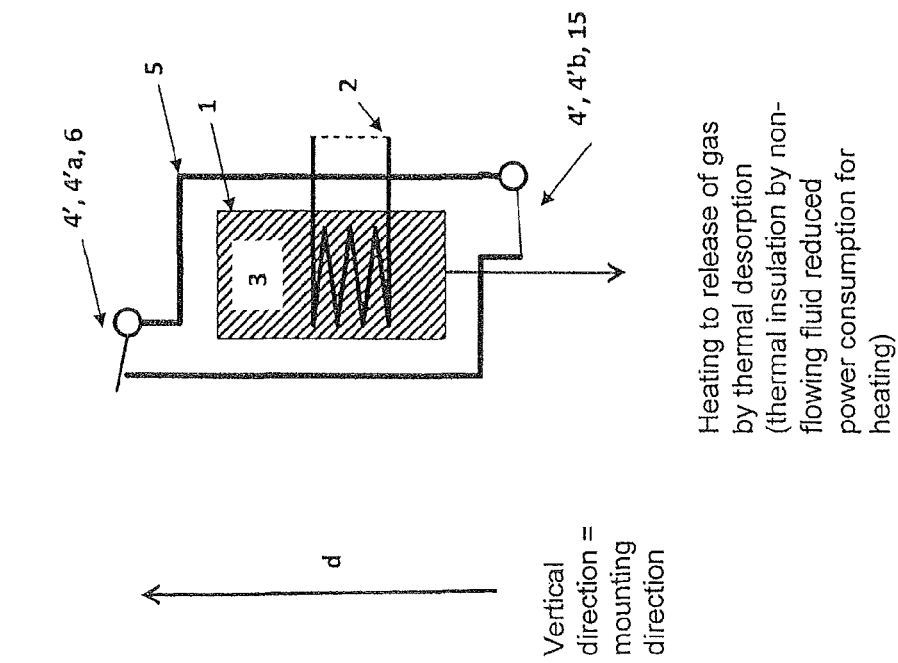

An alternative embodiment is shown in FIGS. 5a and 5b. It corresponds to the embodiment of FIGS. 1a and b, but the heat transport is here based on passive convection, while it is based on active convection in the previous figures. The fluid flow device 4 (fan/blower/pump)—including an optional one-way valve—of the previous figures is replaced by a passive-convection control device 4'. This means that this embodiment has no device to actively produce convection of the convection gas.

The passive-convection control device 4' is, for example, a shutter 4'a arranged to selectively open and close the fluid-flow path including the fluid gap. The shutter 4'a is actuated by an, e.g. electromagnetic actuator. The shutter 4'a is, for example, mounted at the exit, or outlet 6 from the fluid gap.

Optionally, in order to prevent any heat transport by diffusion when the shutter 4'a at the outlet 6 is closed an additional inlet shutter 4'b can be provided at the inlet 15 to the fluid gap. The inlet shutter 4'b can be opened and closed in unison with the outlet shutter 4'b. The actuation of the inlet shutter 4'b is provided by a separate actuator, which may also be an electromagnetic actuator. In other embodiments there is only an inlet shutter 4'b Passive convection may thus be disabled by closing an outlet shutter, or an inlet shutter, or both an outlet shutter and an inlet shutter.

Passive convection is based on the fact that convection gas is heated by taking up from the storage unit, and that warm convection gas has a lower density than cold convection gas which a natural uplift of the convection gas. To enable passive convection when the outlet shutter 4'a, and/or the inlet shutter 4'b, is open the storage unit and its encapsulation are arranged such that the longitudinal direction of the air gap (which is mainly characterized by the direction of convection between the inlet and the exit for the convection gas) is oriented vertically or at least with a component in the vertical direction. The inlet 15 for the convection gas is lower than the outlet 6 by the distance "d" in FIGS. 5a and 5b. "Vertical" and "lower" refers to the nominal orientation of the storage unit and the apparatus to which it is mounted. For example, the nominal orientation of vehicle is determined by the vehicle standing on the vehicle wheels; in a vehicle the storage unit is mounted such that the convection gap is oriented vertically or at least with a component in the vertical direction when the vehicle stands on its wheels. The vertical direction is illustrated by an arrow at the left-hand side of FIG. 5a.

All the other aspects, functions and features described in general and in connection with the active-convection embodiments of FIGS. 1 to 4 also apply to the passive-convection embodiment of FIG. 5. Reference is therefore made to the general description and the description of the active-convection embodiments, e.g. in the context of FIGS. 1 to 4, on the proviso that passive-convection control device 4' is controlled such that it enables/disables passive convection in analogy to operating/ceasing the operation of the fluid flow device of FIGS. 1 to 4.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A device for controlled dosing of ammonia for reducing NOx from the exhaust of an internal combustion engine of a vehicle via selective catalytic reduction, said device comprising:
at least one start-up storage unit containing a solid ammonia storage material reversibly storing ammonia by absorption or adsorption, and desorption, the at least one start-up storage unit being equipped with a heater to release ammonia by desorption,
at least one additional larger storage unit with ammonia storage material, the larger storage unit having a supply pressure generated by heating of the ammonia storage material in the larger unit, and
a controller,
said start-up storage unit further comprising:
a fluid gap between the at least one start-up storage unit and an encapsulation;
a fluid flow device to control the flow of gaseous fluid through the gap between the at least one start-up storage unit and the encapsulation, or a passive-convection control shutter to control passive convection of gaseous fluid through the gap between the at least one storage unit and the encapsulation, the passive-convection control shutter arranged to selectively open and close a fluid-flow path including the fluid gap;
the controller being programmed to carry out a method comprising:
during ammonia release from the ammonia storage material of the start-up storage unit, heating the storage material by a heater, and controlling effective heat transfer from the start-up storage unit during ammonia release, by ceasing operation of the fluid flow device, or by regulating convection created by the fluid flow device such that it is lower than that during re-saturation, or by disabling passive-convection by means of the passive-convection control shutter; and
re-saturating the start-up storage unit comprising performing immediately after use of the start-up storage unit when the vehicle is parked, saturation of the storage material with ammonia delivered from the larger storage unit by heating the larger storage unit, the heater of the start-up storage unit being off, and controlling effective heat transfer from the start-up storage unit by operating the fluid flow device, or by regulating the convection created by the fluid flow device such that it is higher than during ammonia release, or by enabling passive-convection by means of the passive-convection control shutter thereby increasing the re-saturation rate of ammonia when ammonia is delivered from the larger storage unit.

2. A device according to claim 1 wherein the solid ammonia storage material of the start-up storage unit comprises a metal ammine complex salt, and the heating of the start-up storage unit is by at least one of electrical heating and heating by waste heat of the engine.

3. A method for reducing NOx from the exhaust of an internal combustion engine via selective catalytic reduction of a vehicle equipped with a start-up storage unit containing a solid ammonia storage material reversibly storing ammonia by absorption or adsorption, and with at least one additional larger storage unit with ammonia storage material, the larger storage unit having a supply pressure generated by heating of the ammonia storage material in the larger unit; the start-up storage unit, to control the effective heat transfer from the start-up storage unit, comprising:

a fluid gap between an outer encapsulation and the start-up storage unit that provides an insulation layer when there is no active movement of a gaseous fluid in the fluid gap, or when there is no passive convection enabled;

a fluid flow device creating forced convection of the gaseous fluid being in contact with a surface of the start-up storage unit to increase heat transfer from the start-up storage unit, or a passive-convection control shutter enabling passive convection of gaseous fluid being in contact with the surface of the storage unit to increase heat transfer from the storage unit, wherein the passive-convection control shutter is arranged to selectively open and close a fluid-flow path including the fluid gap;

an exit of the encapsulation where the gaseous fluid forced in convection by the fluid flow device, or the gaseous fluid, with enabled passive-convection, can exit;

a heater to heat the storage material of the start-up storage unit;

the method comprising:

during ammonia release from the storage material of the start-up storage unit, the storage material in the start-up storage unit is heated by the heater, and the controlling of the effective heat transfer from the storage unit is performed, during ammonia release, by ceasing operation of the fluid flow device, or by regulating the convection created by the fluid flow device such that it is lower than that during re-saturation, or by disabling passive convection by means of the passive-convection control shutter;

re-saturating the storage material in the start-up storage unit, wherein re-saturating comprises performing, immediately after use of the start-up storage unit when the vehicle is parked, re-saturation of the storage material in the start-up storage unit with ammonia delivered from the larger storage unit by heating the larger storage unit, the heater of the start-up storage unit being off and by controlling the effective heat transfer from the start-up storage unit by operating the fluid flow device, or by regulating the convection created by the fluid flow device such that it is higher than that during ammonia release, or by enabling passive convection by means of the passive-convection control shutter, thereby increasing the re-saturation rate of ammonia when ammonia is delivered from the larger storage unit.

4. The method according to claim 3 wherein the solid ammonia storage material of the start-up storage unit comprises at least one of activated carbon and a zeolite.

5. The method according to claim 3 wherein the gaseous fluid is air.

6. The method according to claim 3 where the fluid flow device is a fan, blower, or pump.

7. The method according to claim 3 wherein the passive-convection control shutter is an exit shutter or an inlet shutter, or wherein there is a passive-convection control exit shutter and a passive-convection control inlet shutter.

8. The method according to claim 3 wherein the effective heat transfer is enhanced by heat transfer fins connected to the surface of the start-up storage unit.

9. The method according to claim 3 comprising reducing a level of a pressure overshoot by actively lowering the temperature level of the start-up storage unit heated by the heater by activating the fluid flow device, or increasing the convection created by the fluid flow device, or by enabling passive convection by means of the passive-convection control shutter, and shutting off the heater until the desorption pressure is determined to be at a setpoint.

10. The method according to claim 3 wherein the solid ammonia storage material of the start-up storage unit comprises a metal salt, which, when containing absorbed ammonia, has the formula $$M_a(NH_3)_nX_z, \qquad (I)$$

wherein M is one or more cations selected from alkali metals, alkaline earth metals, and/or transition metals, or combinations thereof, X is one or more anions selected from fluoride, chloride, bromide, iodide, nitrate, thiocyanate, sulphate, molybdate, and phosphate ions; a is the number of cations per salt molecule; z is the number of anions per salt molecule; and n is the coordination number of 2 to 12.

11. The method according to claim 10 wherein the coordination number is 6 to 8.

12. The method according to claim 10 wherein M is one or more cations selected from alkali metals selected from Li, Na, K and Cs; alkaline earth metals selected from Mg, Ca, Sr and Ba; transition metals selected from V, Cr, Mn, Fe, Co, Ni, Cu and Zn, and combinations thereof selected from NaAl, KAl, $K_2Zn$, CsCu, and $K_2Fe$.

* * * * *